(12) United States Patent
Otsuki et al.

(10) Patent No.: US 10,350,704 B2
(45) Date of Patent: Jul. 16, 2019

(54) LASER PROCESSING METHOD AND LASER PROCESSING APPARATUS

(71) Applicant: Via Mechanics, Ltd., Atsugi-shi, Kanagawa (JP)

(72) Inventors: Haruaki Otsuki, Hiatchinaka (JP); Kyosuke Suzuki, Ebina (JP); Satoshi Fukushima, Ebina (JP)

(73) Assignee: Via Mechanics, Ltd., Atsugi-shi (JP)

(*) Notice: Subject to any disclaimer, the term of this patent is extended or adjusted under 35 U.S.C. 154(b) by 374 days.

(21) Appl. No.: 15/418,174

(22) Filed: Jan. 27, 2017

(65) Prior Publication Data

US 2017/0216965 A1 Aug. 3, 2017

(30) Foreign Application Priority Data

Jan. 29, 2016 (JP) .................................. 2016-015693

(51) Int. Cl.

| B23K 26/035 | (2014.01) |
| B23K 26/08 | (2014.01) |
| B23K 26/402 | (2014.01) |
| B23K 26/082 | (2014.01) |
| B23K 26/0622 | (2014.01) |
| B23K 26/382 | (2014.01) |
| B23K 101/36 | (2006.01) |
| B23K 101/42 | (2006.01) |

(52) U.S. Cl.
CPC ........ *B23K 26/035* (2015.10); *B23K 26/0622* (2015.10); *B23K 26/082* (2015.10); *B23K 26/0853* (2013.01); *B23K 26/382* (2015.10); *B23K 26/402* (2013.01); *B23K 2101/36* (2018.08); *B23K 2101/42* (2018.08)

(58) Field of Classification Search
CPC .............................. B23K 26/03; B23K 26/08
USPC ............ 219/121.68–121.71, 121.78–121.81; 700/166
See application file for complete search history.

(56) References Cited

U.S. PATENT DOCUMENTS

| 4,032,743 A * | 6/1977 | Erbach ............... B23K 26/0823 219/121.7 |
| 5,274,621 A * | 12/1993 | Akatsuka ............... G06K 1/126 235/475 |
| 6,573,474 B1 * | 6/2003 | Loringer .............. B23K 26/384 219/121.71 |

(Continued)

FOREIGN PATENT DOCUMENTS

| JP | 2004-142082 A | 5/2004 |
| JP | 3561159 B2 | 9/2004 |
| JP | 2012-187620 A | 10/2012 |

*Primary Examiner* — Samuel M Heinrich
(74) *Attorney, Agent, or Firm* — Crowell & Moring LLP

(57) ABSTRACT

The object of the present invention is to achieve the combination processing that accelerates the processing speed while keeping the accuracy of finishing. In the combination processing consisting combination of stationary processing and synchronization processing, the processing of the section in the rows in an processing area is performed from a first end to a second end of a row, and then from the second end to the first end of the next row so that the processing is performed from side to side. The stationary processing is performed in sections having relatively low processing densities and the synchronization processing is performed in the other sections than the sections for the stationary processing.

10 Claims, 14 Drawing Sheets

(56) References Cited

U.S. PATENT DOCUMENTS

| | | | |
|---|---|---|---|
| 2004/0112881 A1* | 6/2004 | Bloemeke | B23K 26/389 219/121.71 |
| 2007/0131662 A1* | 6/2007 | Shedlov | B23K 26/10 219/121.67 |
| 2011/0017716 A1* | 1/2011 | Rumsby | G03F 7/70383 219/121.72 |
| 2011/0210105 A1* | 9/2011 | Romashko | B23K 26/0732 219/121.72 |
| 2012/0219340 A1* | 8/2012 | Rumsby | B23K 26/0846 400/76 |
| 2012/0241427 A1* | 9/2012 | Maltsev | B23K 26/0732 219/121.85 |
| 2016/0210498 A1* | 7/2016 | Schlaudraff | G02B 21/32 |
| 2018/0257176 A1* | 9/2018 | Wu | B23K 26/38 |

* cited by examiner

LASER PROCESSING METHOD AND LASER PROCESSING APPARATUS

CROSS-REFERENCE TO RELATED APPLICATION

The present application claims priority from Japanese Patent Application No. 2016-015693 filed on Jan. 29, 2016, the content of which is hereby incorporated by reference into this application.

TECHNICAL FIELD OF THE INVENTION

The present invention relates to a laser processing method and a laser processing apparatus for making holes at a plurality of positions in a workpiece such as a printed-circuit board by laser scanning.

BACKGROUND OF THE INVENTION

As the examples of laser processing method for making holes, there are a processing method (hereinafter, called "stationary processing") in which laser scanning is performed on a workpiece mounted on a stationary table, and another processing method (hereinafter, called "synchronization processing") in which laser scanning is performed on a workpiece mounted on a table while moving the table in order to accelerate the processing speed.

Japanese Patent No. 3561159, Patent Laid-Open No. 2004-142082, and Japanese Patent Laid-Open No. 2012-187620 disclose the inventions related to the synchronization processing. Especially Japanese Patent Laid-Open No. 2004-142082 discloses a processing method in which the stationary processing and the synchronization processing are combined (hereinafter, called "combination processing"). In the combination processing, the synchronization processing is performed when a workpiece has a uniformly low density of holes. When the workpiece has an uneven density of holes, the synchronization processing is performed in areas having low densities of holes and the stationary processing is performed in areas having high densities of holes.

However, in the method disclosed in Japanese Patent Laid-Open No. 2004-142082, the areas having low densities of holes are subjected to the synchronization processing and the table preferably be moved across the areas within the time periods for the laser scanning in the areas as timely as possible. If the density of hole in an area is extremely low, however, it is difficult to move the table within the time period for the laser scanning in the area, which may necessitate a halt in the laser scanning and slow down the overall processing speed. In addition, when the synchronization processing in an area having an extremely low density of holes is followed by the stationary processing, or in the opposite case, the state of the table should be transferred from a high-speed moving state to a stationary state, or in the opposite direction, which increases the change in the speed of the table and makes it difficult to keep the accuracy of finishing. When the stationary processing is performed in an area having a high density of holes, for making processing of the next area, the table should be moved over a long distance in correspondence to the stationary processing. As a result of this, if the processing speed is intended to be accelerated by increasing the speed of the table, it will increase the change in the speed of the table and make it difficult to keep the accuracy of finishing.

SUMMARY OF THE INVENTION

The object of the present invention is to achieve the combination processing that accelerates the processing speed while keeping the accuracy of finishing.

One typical example of the invention disclosed in this application is as follows.

That is, a laser processing method combining synchronization processing performed by laser scanning with a laser scanning system while making the relative movement between a table for mounting a workpiece and the laser scanning system and stationary processing performed by laser scanning with the laser scanning system while halting the relative movement, comprising:

sequentially assigning sections in a first direction parallel to or orthogonal to the direction of the relative movement in rows in a processing area of the workpiece, each of the sections having unit size smaller than a scanning area of the laser scanning system and the rows being arranged in a second direction orthogonal to the first direction; and setting a processing order to sequentially process the sections in the rows in the processing area from a first end to a second end of a row, and then from the second end to the first end of the next row so that the processing is performed from side to side at the rows next to each other, wherein the stationary processing is performed in sections having relatively low processing densities and the synchronization processing is performed in the other sections than the sections for the stationary processing.

According to the present invention, it is possible to achieve the combination processing that accelerates the processing speed while keeping the accuracy of finishing.

BRIEF DESCRIPTIONS OF THE DRAWINGS

DESCRIPTIONS OF THE PREFERRED EMBODIMENTS

First Embodiment

Figure 2:
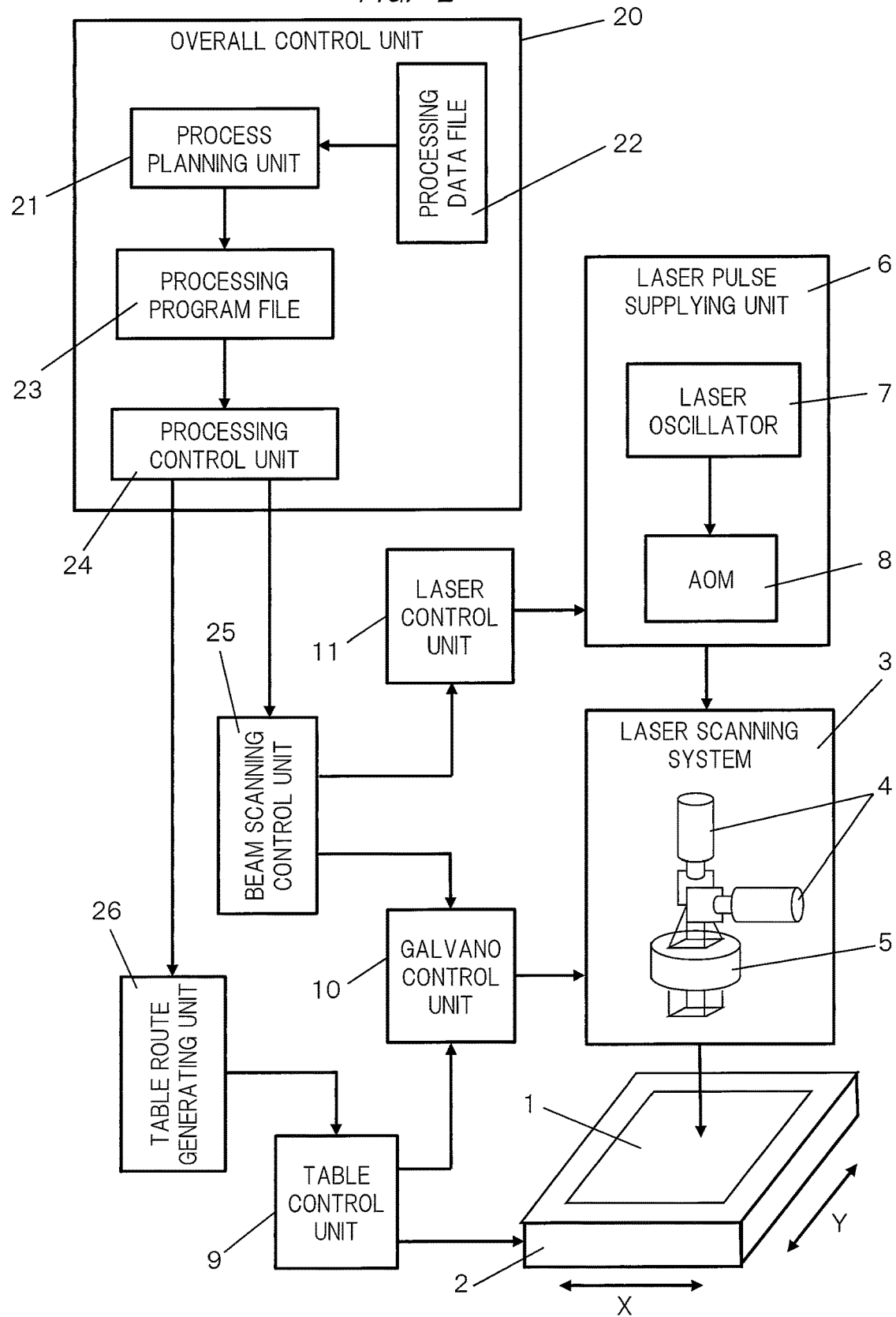
FIG. 2 is a block diagram illustrating a laser processing apparatus for making holes according to the first embodiment of the invention.

The first embodiment of the present invention will now be described. FIG. 2 is a block diagram illustrating the laser processing apparatus for making holes according to the first embodiment of the invention. FIG. 2 illustrates the following elements. A printed-circuit board 1 is subjected to the processing for making holes, a table 2 holds the printed-circuit board 1 mounted on the table 2, and a laser scanning system 3 adjusts and moves the irradiation position of laser pulses. The laser scanning system 3 includes a pair of Galvano scanners 4 and condensing (fθ) lenses 5 for the X-axis and the Y-axis. A laser pulse supplying system 6 supplies laser pulses to the laser scanning system 3. The laser pulse supplying system 6 includes a laser oscillator 7 for generating laser pulses and an acousto-optic modulator (AOM) 8 for controlling the output of laser pulses to the laser scanning system 3 by branching control. A pair of table control units 9 controls the position of the table 2 in the X-axis and the Y-axis. The table control unit 9 moves the table 2 with respect to the laser scanning system 3 at a fixed position to change the position of the scanning area of the laser scanning system 3. A pair of Galvano control units 10 controls the operation of the Galvano scanners 4 in the laser scanning system 3. A laser control unit 11 controls the output of laser pulses from the laser pulse supplying system 6 to the laser scanning system 3. Although there are actually two table control units 9 for the X-axis and the Y-axis and two Galvano control units 10 for the X-axis and the Y-axis as a pair respectively, FIG. 2 illustrates only one of them.

An overall control unit 20 controls the overall operation of the apparatus. The overall control unit 20 is embodied by a processor that works under program control, for example, and includes some elements. A process planning unit 21, one of the elements, generates a processing program for processing operation control based on the processing data of the printed-circuit board 1 stored in a processing data file 22 prior to the processing, and stores the processing program in a processing program file 23. A processing control unit 24 reads the processing program from the processing program file 23 when performing the processing, and performs the processing by using and controlling a beam scanning control unit 25 and a table route generating unit 26 controlled by the processing control unit 24 according to the processing program.

In FIG. 2, although the table control unit 9, the Galvano control unit 10, the laser control unit 11, the beam scanning control unit 25, and the table route generating unit 26 are configured to be separated from the overall control unit 20, however, all or some of the units 9, 10, 11, 25, and 26 may be included in the overall control unit 20. In that case, these units may be embodied by a program in the overall control unit 20. Also, FIG. 2 only illustrates the main connecting lines between the structural elements necessary for describing the present embodiment and does not illustrate all the necessary lines between the structural elements.

The printed-circuit board 1 generally has various patterns of holes in a processing area to be made holes. In most cases, specific patterns are repeated in the X-axis direction and the Y-axis direction. Here, for the purpose of fully explaining the invention, this specification takes the pattern that does not include repeated specific patterns as an example.

Figure 7:
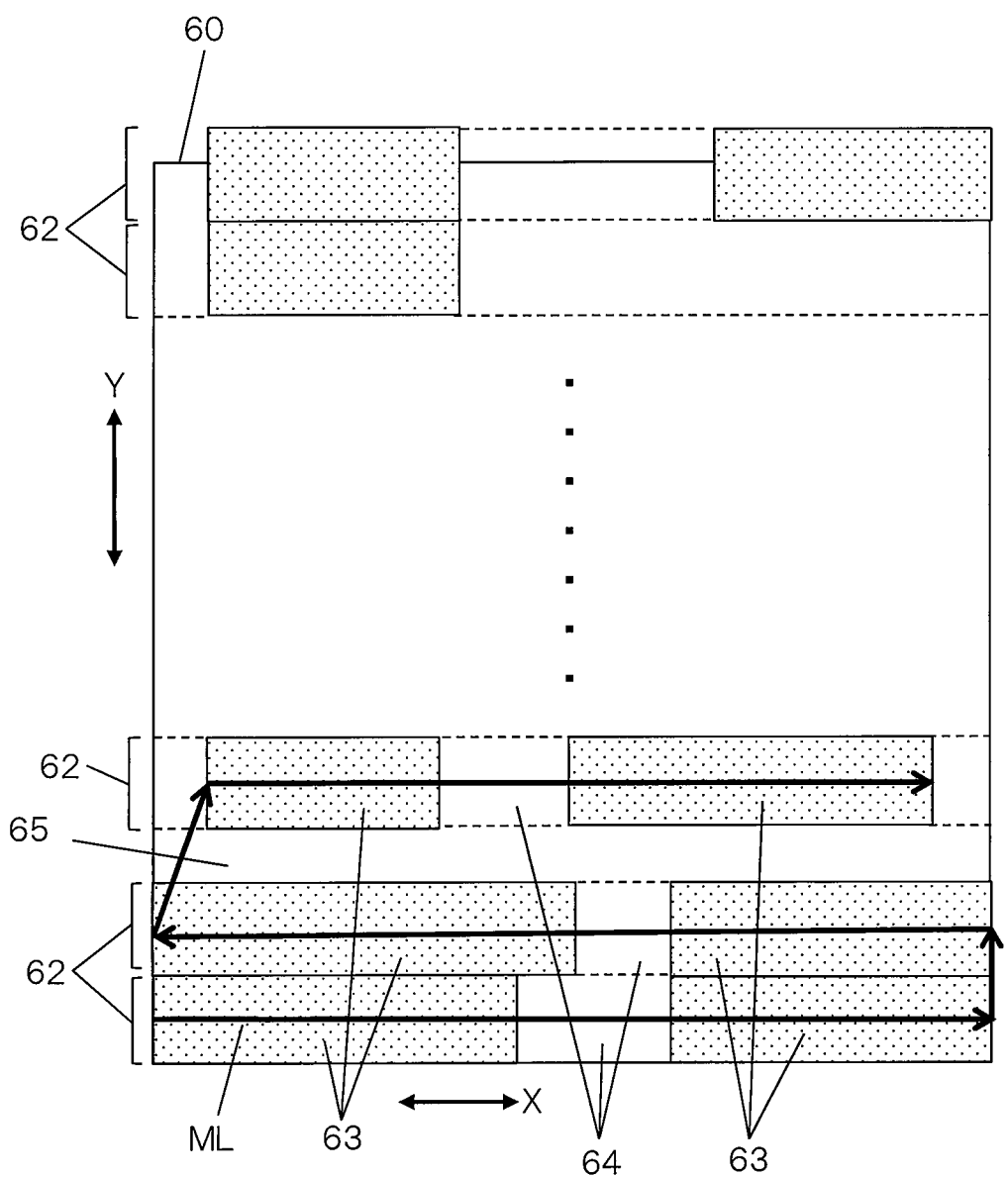
FIG. 7 is a diagram for explaining the operation of the process planning unit in FIG. 2.

As illustrated in FIG. 7, the process planning unit 21 sequentially assigns sections having a unit size bisecting the scan area by the laser scanning system 3 in the X-axis direction (lateral direction) in advance so that these sections are logically arranged one by one towards the right end of the X-axis direction, by making the lower left end of a processing area 60 as the base. One unit of each section is equal to a half of the scanning area of the laser scanning system 3 in the X-axis direction (in the lateral direction). A row 62 includes a plurality of the sections having the same position assigned or arranged in the Y-axis direction and a plurality of the rows 62 are arranged from the lower end as a base to the upper side in the Y-axis direction. Band areas 63 are those in which a series of sections are arranged (hereinafter, called "section series band area"). Band areas 64 are not-to be-processed band areas in the row 62 which is not assigned the section because of no need to be processed. Band areas 65 are inter-row band areas 65 which are not assigned the row 62 because of no need to be processed.

Figure 1:
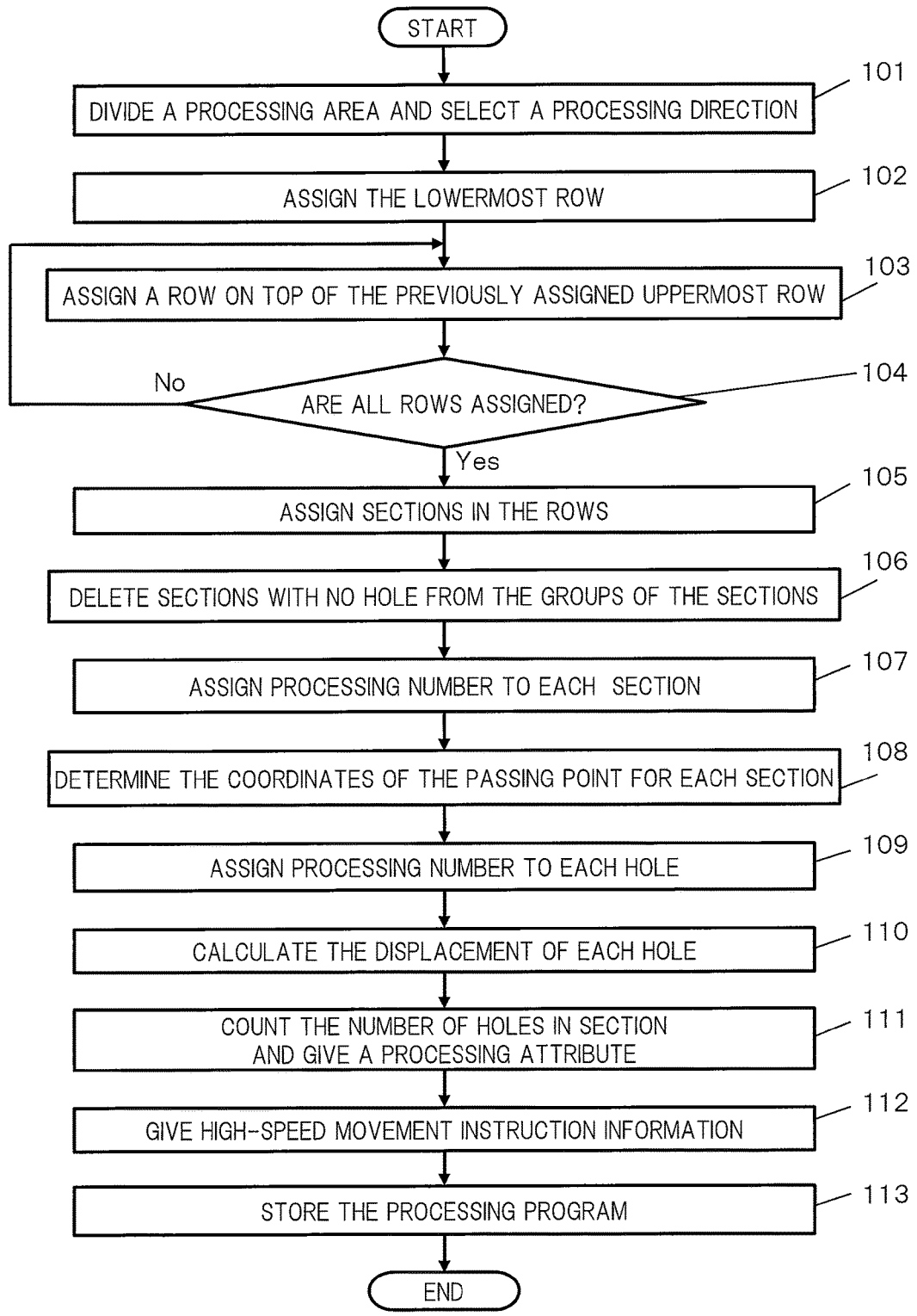
FIG. 1 is a flow chart illustrating the operation of a process planning unit according to a first embodiment of the invention.
Figure 3:
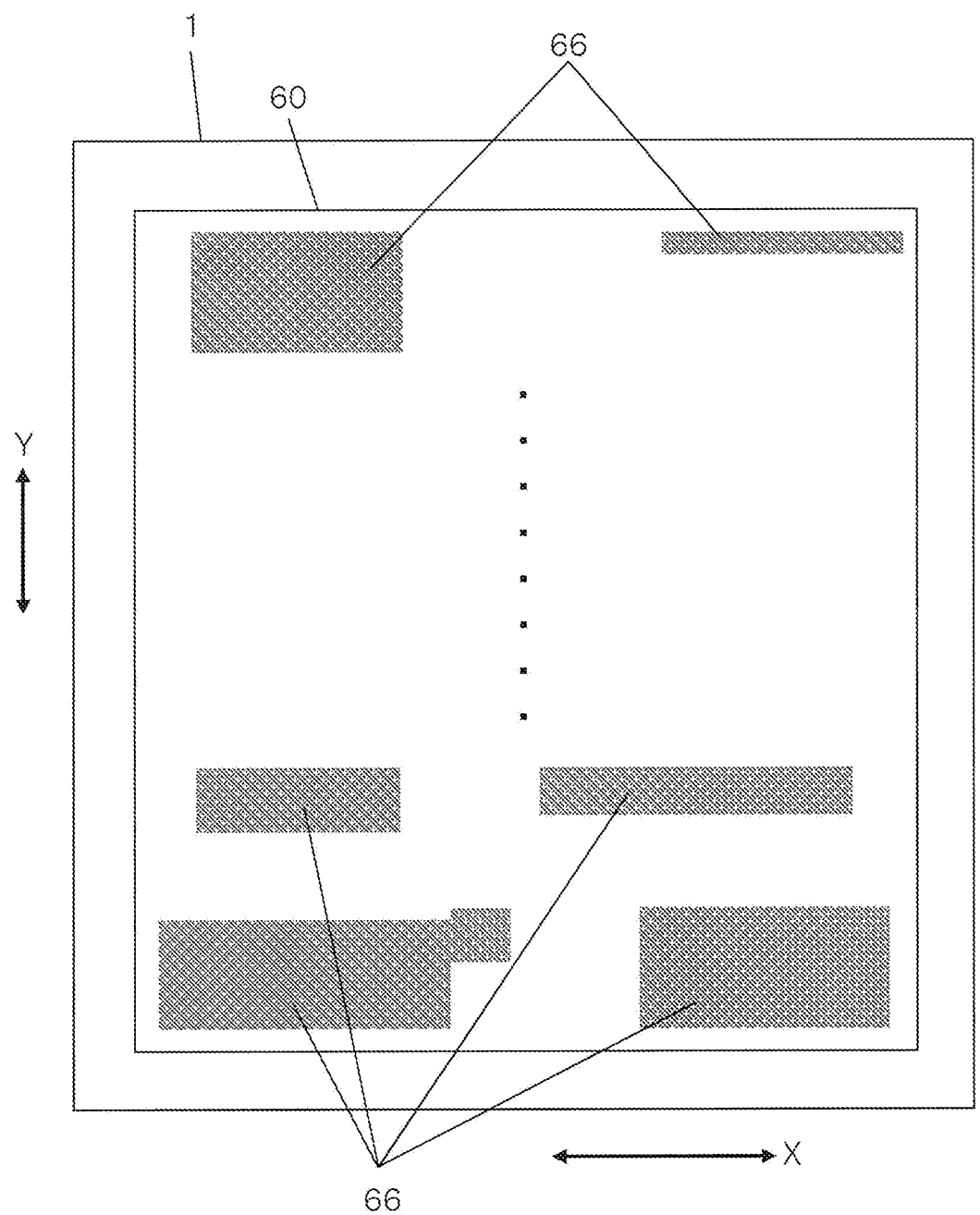
FIG. 3 is a diagram for explaining the operation of the process planning unit in FIG. 2.

FIG. 1 is a flow chart illustrating the operation of the process planning unit 21. In FIG. 1, 101 is a step in which the processing area is divided and processing directions are selected. As illustrated in FIG. 3, a rectangular processing area 60 is assigned so that the processing area 60 encompasses all hole zones 66 in the printed-circuit board 1, and the processing direction is selected in the X-axis direction or the Y-axis direction. In this embodiment, the processing direction is set in the X-axis direction. Step 102 is a step in which the lowermost row 62 is assigned. The lowermost row 62 is rectangular and in contact with the lower side of the processing area 60. The lowermost row 62 has a width (a vertical length) equal to the length of the side of the scanning area in the direction orthogonal to the processing direction.

Step 103 is a step in which the process planning unit 21 assigns another rectangular row on top of the uppermost row that has previously been assigned. At step 103, a rectangular row 62 having an area equal to that of the previously assigned rectangular area is assigned so that the newly assigned row 62 includes or covers the lowest hole in the upper side of the previously assigned row 62 at step 102.

Figure 4:
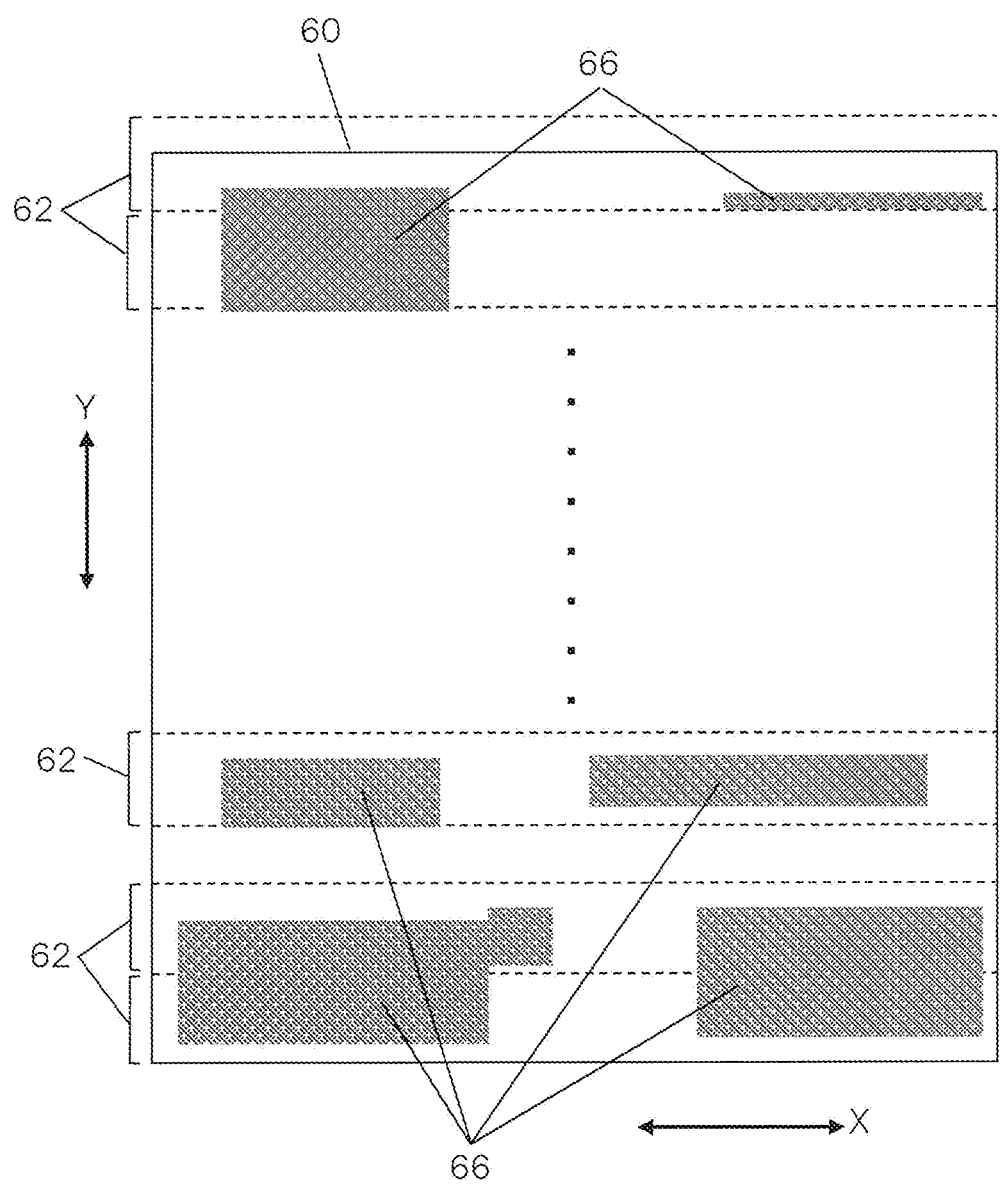
FIG. 4 is a diagram for explaining the operation of the process planning unit in FIG. 2.

Step 104 is a step in which the process planning unit 21 determines whether all the rows 62 are completely assigned or not. At step 104, it is determined whether all the holes are covered with the rows 62 or not. If not, the process planning unit 21 repeats step 103 until all the hole zones 66 are covered with the rows 62 as illustrated in FIG. 4. 105 is a step in which the process planning unit 21 sequentially assigns sections from the left end to the right end in the X-axis direction in the rectangular rows 62 so that these sections are logically arranged one by one in the rows 62. Each section has size obtained by bisecting the scanning area in the processing direction, therefore, size of each section is equal to a half of the scanning area in the processing direction.

In this embodiment, the length of the processing area 60 in the processing direction is an integral multiple of the half length (bisected back and forth) of the scanning area in the processing direction, so that the number of the sections in one row becomes an integer.

Figure 5:
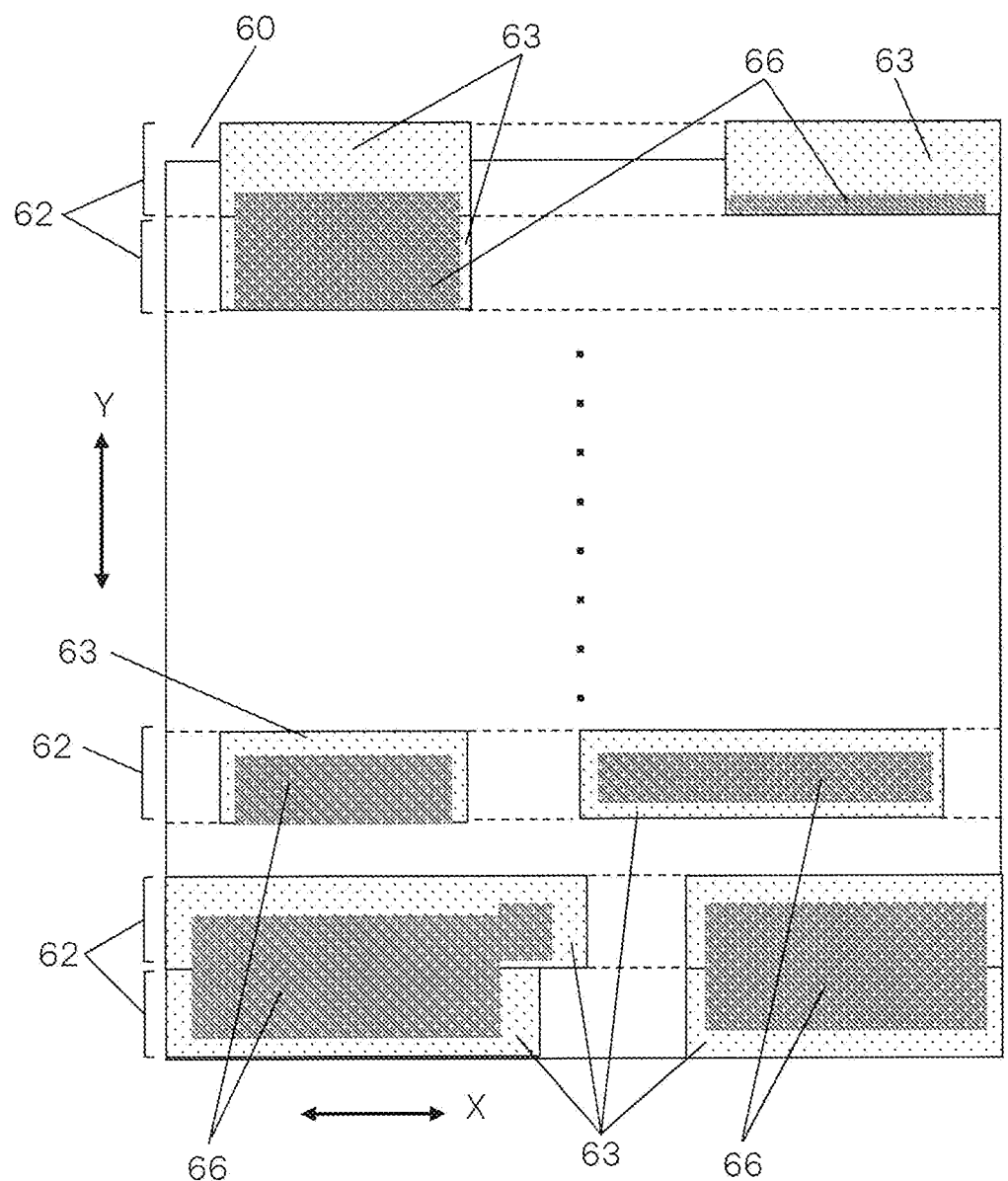
FIG. 5 is a diagram for explaining the operation of the process planning unit in FIG. 2.
Figure 6:
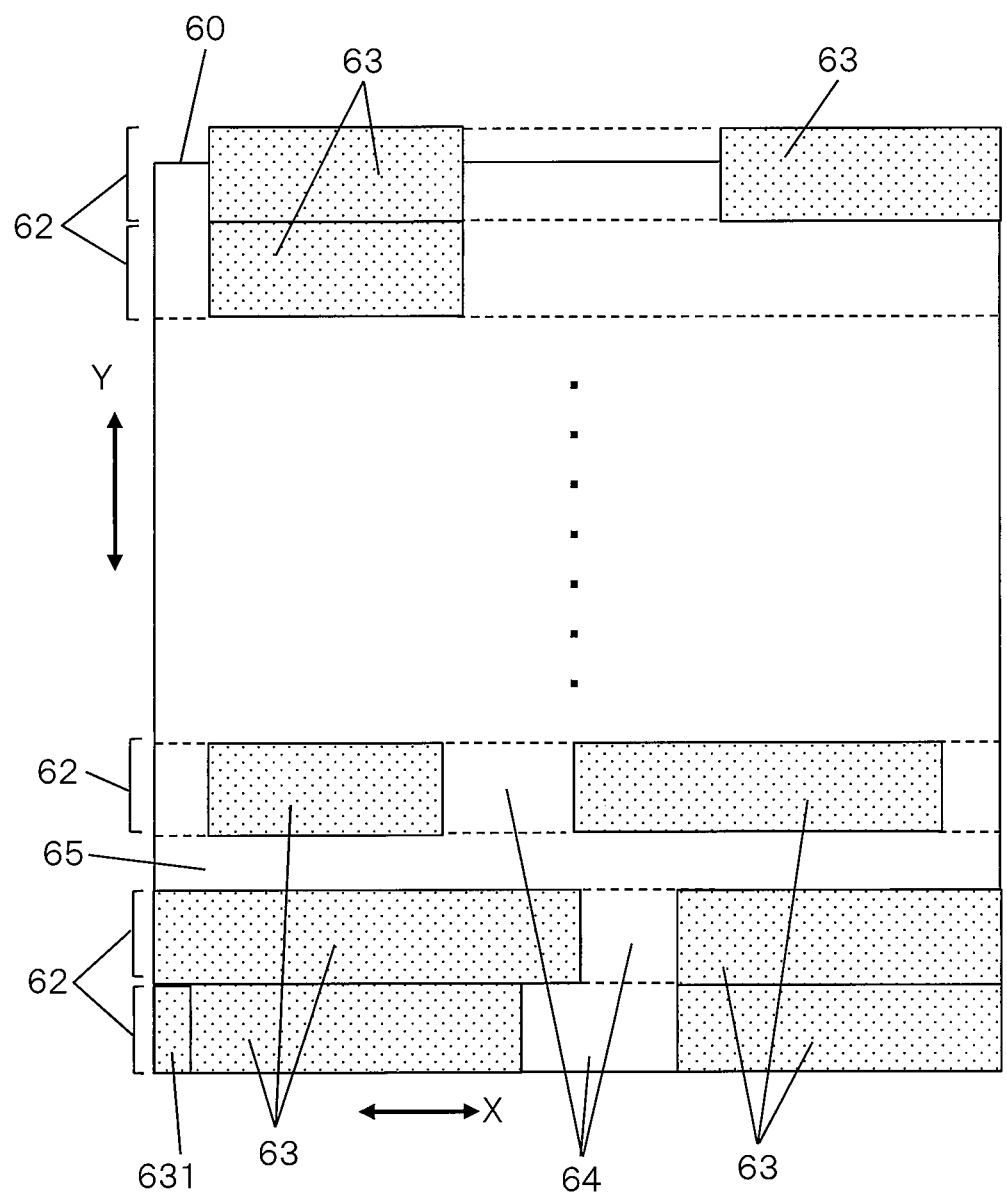
FIG. 6 is a diagram for explaining the operation of the process planning unit in FIG. 2.

Step 106 is a step in which the process planning unit 21 sequentially checks the sections from the left end in order and if there are sections with no hole, such sections are deleted from the groups of the sections among the groups of sections assigned at step 105. The results are shown in FIGS. 5 and 6. FIG. 5 illustrates the section series band areas 63 with the hole zones 66 overlapped thereon. FIG. 6 illustrates one representative section 631 at the top of the section series band area 63.

Step 107 is a step in which the process planning unit 21 sequentially assigns processing numbers to the sections that have not been deleted at step 106 in ascending order starting from the left end to the right end in the X-axis direction in the lowermost row. At step 107, after assigning a number to the section at the end of the row, the process planning unit 21 assigns a number to the section on the same side in the next row above and continues to sequentially assign processing numbers to the sections in the next row in the processing direction. After that, the switch of rows is made at each end repeatedly in the same way.

Step 108 is a step in which the process planning unit 21 determines the coordinates of the passing points for the sections. The passing points become the target positions when the table is moved for sequentially processing the sections. As for the sections having the smallest number in the rows (the section at the left end of the lowermost row, for example), the process planning unit 21 determines the middle point of the front side of such a section in the processing direction as the passing point for the section. As for the sections right after the sections deleted at step 106 (the not-to-be-processed band areas) except for the sections having the largest number in the rows (the section at the right end of the lowermost row, for example), the process planning unit 21 determines the middle point of the front side of such a section in the processing direction as the passing point for the section. As for the other sections (the section at the back of a series of sections when sections are continued in series, for example), the process planning unit 21 determines the middle point of the back side of such a section in the processing direction as the passing point for the section.

Step 109 is a step in which the process planning unit 21 sequentially assigns processing numbers to the holes in the sections. The process planning unit 21 assigns processing numbers to the holes in an optimal order starting from one of the holes in the section at the left end of the lowermost row. At step 109, the process planning unit 21 continues to sequentially assign processing numbers to the holes in accordance with the processing numbers assigned to the sections at step 107 until the process planning unit 21 finishes assigning processing numbers to all the holes in all the sections. The optimal order can be determined so that the required displacement of the Galvano scanner becomes as small as possible between the sections, for example.

Step 110 is a step in which the process planning unit 21 calculates the displacement of each hole. The process planning unit 21 calculates the X and Y components of the displacement of each hole from the passing point for the section including the hole, i.e. the required displacement of the Galvano scanner.

Step 111 is a step in which the process planning unit 21 counts the number of holes in each section and gives a processing attribute to the section. If the number of holes in a section is below the threshold described later, the process planning unit 21 gives the section the processing attribute for performing the stationary processing. If the number of holes in a section is equal to or above the threshold, the process planning unit 21 gives the section the processing attribute for performing the synchronization processing while moving the table at a speed suitable for the number of holes in the section (hereinafter a synchronization moving speed).

Step 112 is a step in which the process planning unit 21 gives high-speed movement instruction information to the sections right before the not-to-be processed band areas such as the sections at the ends of the section series band areas 63, and the sections at which the switch of rows is made after the processing in the sections, i.e. the sections at the ends of the rows, for example. The high-speed movement instruction information enables the high-speed movement of the table.

Step 113 is a step in which the process planning unit 21 stores a processing program in a file. The process program includes the coordinates of the passing points for the sections, the processing attributes of the sections, the synchronization moving speeds of the sections having the synchronization processing attributes, the data related to the required displacement of the Galvano scanner for each hole in the sections, and the high-speed movement instruction information, all of which have been obtained through the processes so far. They are arranged in the process program in accordance with the processing numbers of the sections.

When each hole is made by a single laser shot, for example, the threshold number of holes, the synchronization moving speed, and other values can be determines by the following expressions:

$$At=Kp/Vsm,\ Vs=Kp/Nh,\ Kp=Ls/Tm,$$

where At is the threshold number of holes, Vsm is the upper limit of the synchronization moving speed in the range ensuring the accuracy and quality of the holes when the synchronization processing is performed, Vs is a synchronization moving speed, Nh is a number of holes, Ls is the length of a section in the processing direction, Kp is a constant of proportionality determined based on the response speed of the laser scanning system, the type of a to-be-processed board, and other conditions such as the type of the processing methods, and Tm is an average processing time per hole under the above conditions.

The high-speed movement instruction information instructs the movement of the table between rows without processing and in the not-to-be-processed band areas. The speed is intended to be higher than the upper limit Vsm of the synchronization moving speed. In this embodiment, the high-speed movement instruction information shows the movement of the table with respect to the laser scanning system at the highest accelerated speed in a plurality of accelerated speeds of the table moved with respect to the laser scanning system.

The overall processing order will now be described. As illustrated in FIG. 7 by line ML indicating the processing route, with the travel of the scanning area, the processing starts from the section at the left end of the leftmost section series band area 63 in the first row at the bottom and proceeds over the sections toward the right end in the X-axis direction in accordance with the processing attribute of each section. After the section at the end of this section series band area 63 is processed, the table is moved with respect to the laser scanning system at the highest accelerated speed to pass not-to-be-processed band area 64. The processing then further proceeds from the section at the left end of the next section series band area 63 on the right toward the right end in the X-axis direction in accordance with the processing attribute of each section. After the section at the end of this section series band area 63 is processed, the table is moved with respect to the laser scanning system at the highest accelerated speed to move from this first row to the next second row above. With the travel of the scanning area, the processing then further proceeds from the section at the right end of the rightmost section series band area 63 in the second row toward the left end in the X-axis direction. In this way, the processing continues to proceed in the other not-to-be-processed band areas and section series band areas. Accordingly, the scanning area is traveled from side to side and then vertically shifted from a row to the above row at each end of the rows and repeated until all the rows are processed.

Figure 8:
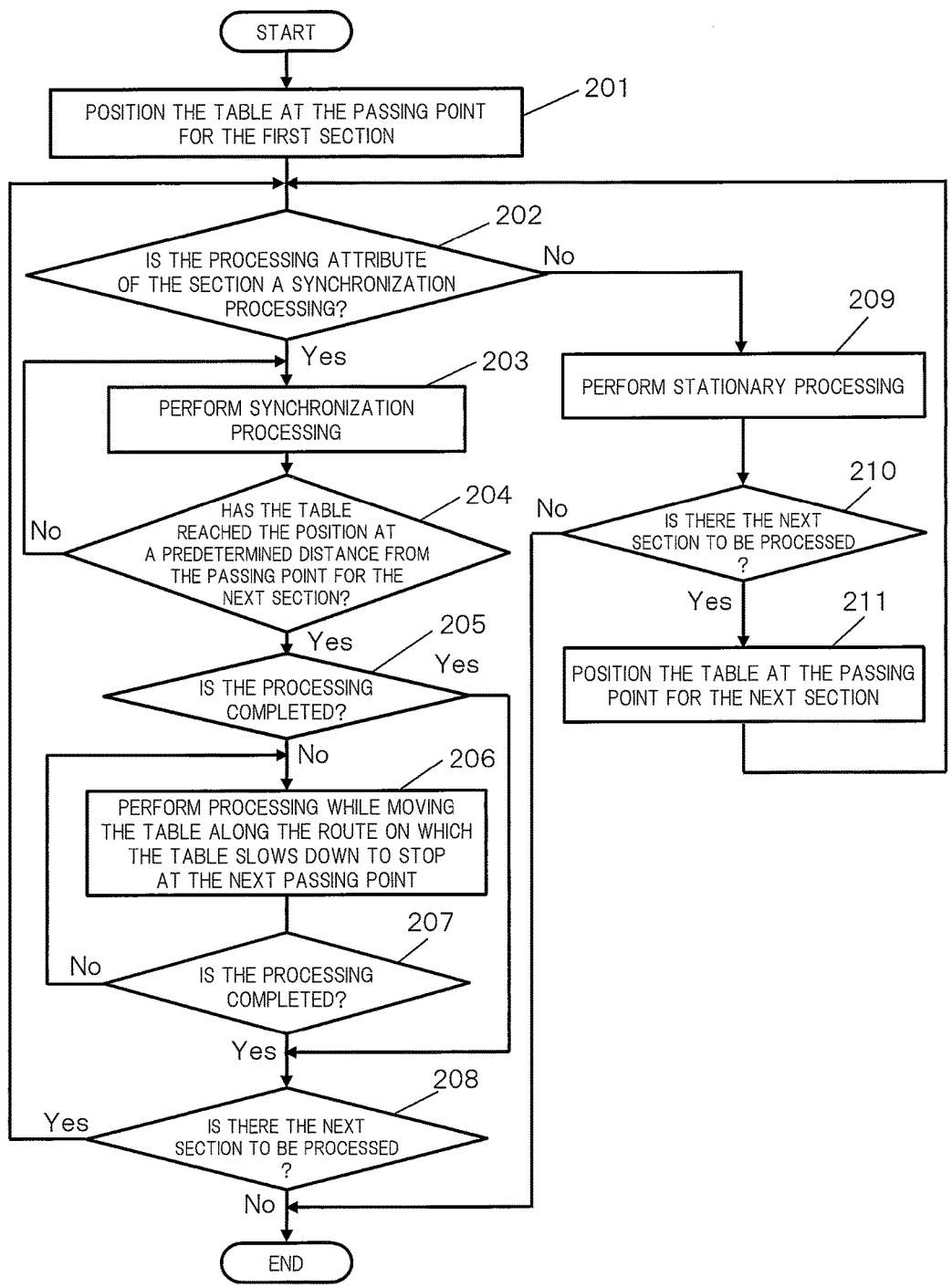
FIG. 8 is a flow chart illustrating the operation sequence of the laser processing apparatus for making holes in FIG. 2.

FIG. 8 is a flow chart illustrating the operation sequence of the laser processing apparatus for making holes in FIG. 2. This operation sequence is proceeded in accordance with the processing program. FIG. 8 illustrates the following steps. At step 201, the table is positioned at the passing point for the first section. At step 202, it is determined whether the section corresponding to a certain passing point has the synchronization processing attribute or not. If yes, the process goes to step 203 for performing the synchronization processing in the section. If the section has the stationary processing attribute instead, the process goes to step 209 for performing the stationary processing in the section. At step 203 for performing the synchronization processing, the Galvano scanner makes holes in the section in a predetermined order while the table is being moved along the route having a predetermined speed profile toward the passing point for the next section.

Step 204 is a step in which it is determined whether the table has reached the position at a predetermined distance from the passing point for the next section. This position is the threshold position enabling the table to slow down to stop at the passing point for the next section. If the table has not reached the position, step 203 for performing the synchronization processing is repeated. If the table has reached the position, the process goes to step 205 for determining whether the processing in the section is completed or not. If the completion is confirmed at step 205, the process goes to step 208. If the completion is not confirmed at step 205, the process goes to step 206. At step 206, the Galvano scanner continues to process the section in a predetermined order while the table is being moved along the route on which the table slows down to stop at the passing point for the next section.

Step 207 is a step in which it is determined whether the processing in the section is completed or not. If completed, the process goes to step 208. If not completed, the process goes to step 206. At step 208, it is determined whether there is the next section to be processed or not. If yes, the process goes back to step 202. If no, the process ends. When the process goes to step 209, the stationary processing is performed in the section. The process then goes to step 210. At step 210, it is determined whether there is the next section to be processed or not. If yes, the process goes to step 211 for positioning the table at the passing point for the next section. If no, the process ends.

If it is determined that the passing point for the next section is the same as the passing point for the present section at step 211, the process directly goes to step 202 considering the positioning of the table at step 211 is done.

Figure 9:
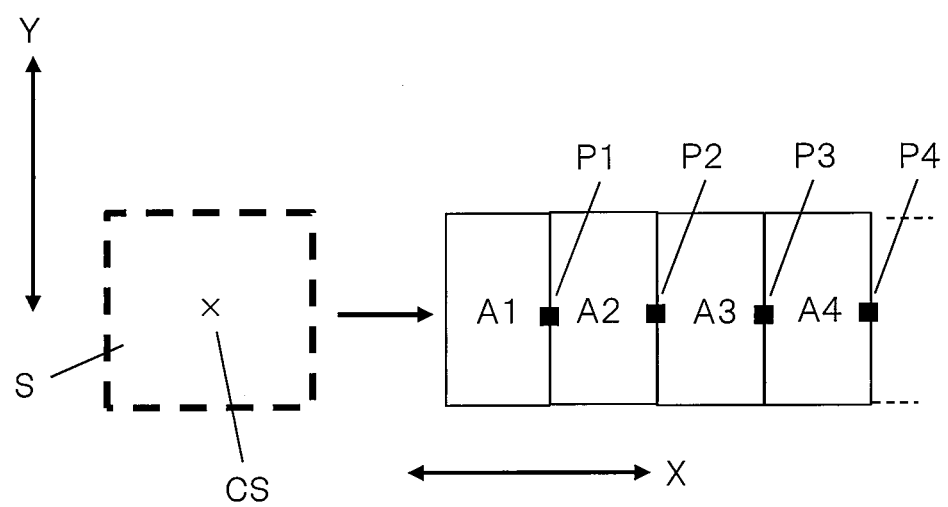
FIG. 9 is a diagram illustrating the passing points in a section series band area including a series of sections in the first embodiment of the invention.

FIG. 9 is a diagram illustrating the passing points in a section series band area including a series of sections. FIG. 9 illustrates the following explanation. A scanning area S of the laser scanning system 3 travels with the movement of the table 2 with respect to the laser scanning system 3 at a fixed position. The scanning area S has a center CS. The section series band area includes a series of sections A1 to A4. Each of the sections A1 to A4 is equal to a half of the scanning area S in the X-axis direction (the lateral direction) as described above.

As described above, as for the sections having the smallest number in the rows (the section at the left end of the lowermost row, for example), the passing point for such a section corresponds to the middle point of the front side of the section in the processing direction. As for the sections right after the not-to-be-processed band areas except for the sections having the largest number in the rows (the section at the right end of the lowermost row, for example), the passing point for such a section corresponds to the middle point of the front side of the section in the processing direction. As for the other sections (the section at the back of a series of sections when sections are continued in series, for example), the passing point for such a section corresponds to the middle point of the back side of the section in the processing direction. Accordingly, the sections A1, A2, A3, and A4 in the section series band area have passing points (middle points) P1, P2, P3, and P4, respectively.

FIG. 10A to 10D are diagrams illustrating the processing example in the section series band area including the sections A1 to A4. The processing example will now be described with reference to the flow chart in FIG. 8 as well as FIGS. 10A to 10D.

Figure 10A:
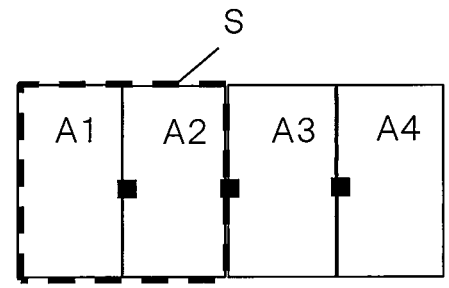
FIGS. 10A to 10D are diagrams illustrating the processing example in the section series band area in the first embodiment of the invention.
Figure 10B:
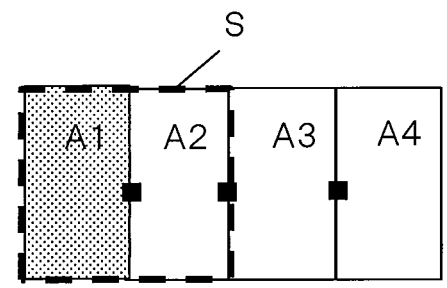

FIGS. 10A to 10D illustrate the following explanation. The rectangular scanning area S is shown by a dashed line. FIG. 10A illustrates the state in which the table is positioned at the passing point for the section A1 at step 201 in FIG. 8. The passing point is at the center CS of the scanning area S, i.e. the origin of the coordinates of the laser scanning system. If the section A1 is given the stationary processing attribute, the section A1 is subjected to the stationary processing while the table is fixed at this position at step 209. FIG. 10B illustrates the state in which the section A1 has gone through the processing. Since the passing point for the section A2 is the same as the passing point for the present section A1, the positioning of the table is considered to be done at step 211 and the process goes to step 202 for determining the processing attribute of the section A2. If the section A2 is given the synchronization processing attribute, the section A2 is subjected to the synchronization processing while the table is being moved along the route having a predetermined speed profile toward the passing point for the next section A3 at step 203.

Figure 10C:
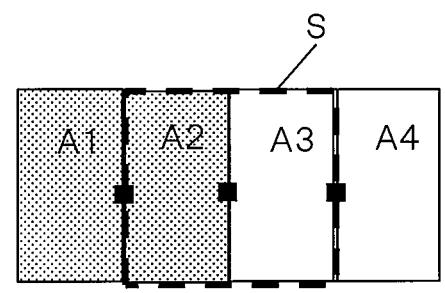
Figure 10D:
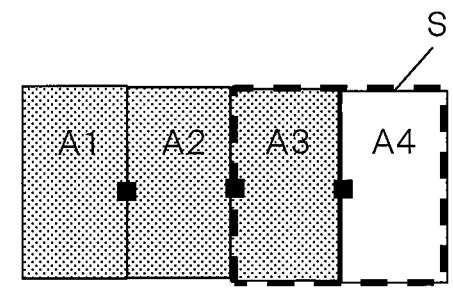

When the table has reached the position at a predetermined distance from the passing point for the section A3 and the section A2 has gone through the processing, the process goes to step 208 and then to step 202 for determining the processing attribute of the section A3. FIG. 10C illustrates the state in which the section A2 has gone through the processing. If the section A3 is given the synchronization processing attribute, the section A3 is subjected to the synchronization processing while the table is being moved continuously along the route having a predetermined speed profile toward the passing point for the next section A4 at step 203 as in the case of the section A2. If a target hole is out of a scanning area of the laser scanning system, the target hole will be made by a shot after the target hole enters the scanning area due to the movement of the table. After the table has reached the position at a predetermined distance from the passing point for the section A4 and the section A3 has gone through the processing, the process goes to step 208 and then to step 202. FIG. 10D illustrates this state.

FIG. 2 is referred to again. While the processing control unit 24 performs the processing in accordance with the processing program in the processing program file 23, the processing control unit 24 sends the instructions on the displacement of the Galvano scanners and the control signals for the laser to the beam scanning control unit 25, and the instructions on the displacement of the table 2 in the X-axis and the Y-axis to the table route generating unit 26. On receipt of the instructions on the displacement of the table 2 in each axis, the table route generating unit 26 determines a route having a trapezoidal or triangular speed profile, and sets the X-axis reference value for the table control unit 9 for the X-axis, and the Y-axis reference value for the table control unit 9 for the Y-axis at a predetermined cycle based on the determined route. Based on the values, the table control units 9 move the table 2 to the determined position. On receipt of the instructions on the displacement of the Galvano scanners, the beam scanning control unit 25 separates the displacement signals for the Galvano scanner for the X-axis from the displacement signals for the Galvano scanner for the Y-axis, and inputs the respective signals to the Galvano control unit 10 for the X-axis and the Galvano control unit 10 for the Y-axis. Each Galvano control unit 10 also receives the data related to the displacement of the table from the table control unit 9 for the corresponding axis. Each Galvano control unit 10 thus controls the corresponding Galvano scanner 4 to set the Galvano scanner 4 at a required deflection angle based on the displacement signals for the Galvano scanner and the data related to the displacement of the table. On receipt of the control signals for the laser, the beam scanning control unit 25 controls the laser control unit 11 to generate laser pulses from the laser pulse supplying system 6.

Figure 11:
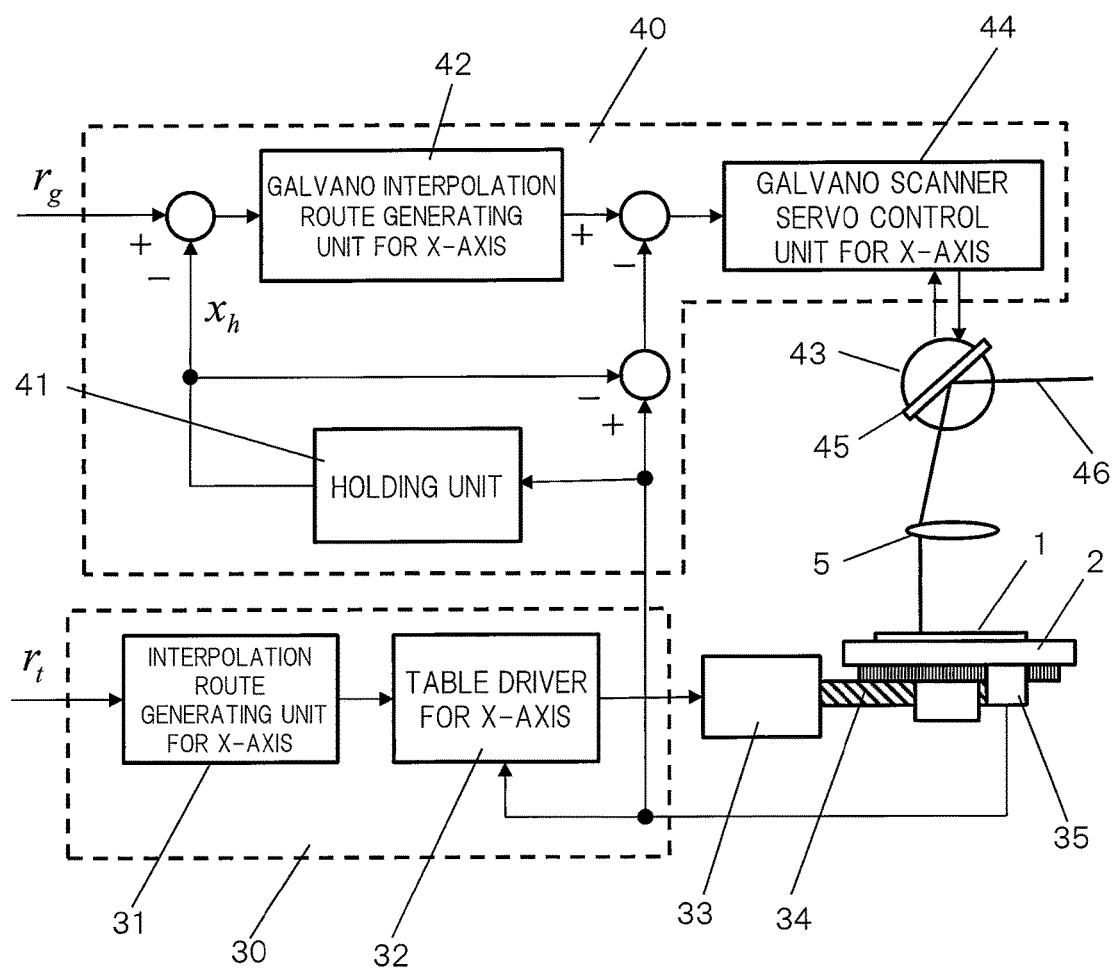
FIG. 11 is a block diagram illustrating a control system for performing the synchronization processing in the laser processing apparatus for making holes in FIG. 2.

FIG. 11 is a block diagram illustrating a control system for performing the synchronization processing with the table 2 and the laser scanning system 3 in the laser processing apparatus for making holes in FIG. 2. This control system actually includes a pair of systems for the X-axis and the Y-axis, each of which has the same structure. FIG. 11 only illustrates the system for the X-axis. In FIG. 11, rt is table position instructions which are sent from the processing control unit 24 to the table control system (unit) 30 for the X-axis. Once the table control system 30 for the X-axis receives the table position instructions rt, an interpolation route generating unit 31 for the X-axis momently generates a reference value in the X-axis along the route having a trapezoidal speed profile. The reference value in the X-axis is then input to a table driver 32 for the X-axis. A motor 33 for the X-axis drives the table 2 in the X-axis via a ball screw 34. A position detector 35 detects the displacement and sends the feedback to the table driver 32 for the X-axis. The table driver 32 for the X-axis compares the reference value in the X-axis with the displacement in the X-axis and determines the voltage to be applied to the motor 33.

On the other hand, rg is Galvano position instructions which are sent from the beam scanning control unit 25 to a Galvano control unit 40 for the X-axis. The Galvano control unit 40 for the X-axis also receives input of table displacement signals in the X-axis. When the Galvano position instructions rg are updated, the table displacement signals are sampled and held by a holding unit 41 to hold the table displacement xh in the X-axis. Accordingly, a Galvano interpolation route generating unit 42 for the X-axis only receives the required displacement of the Galvano scanner for the X-axis which is obtained by excluding the table displacement xh in the X-axis. The difference between this required displacement and the previous required displacement obtained when the previous Galvano position instructions rg in the X-axis is given is the required amount of the movement of the Galvano scanner 43 for the X-axis. The Galvano interpolation route generating unit 42 for the X-axis determines an interpolation route corresponding to this amount of movement and momently outputs the reference value. Since the position of the table 2 in the X-axis is continuously changing on the other hand, the output of the Galvano interpolation route generating unit 42 for the X-axis is compensated according to the change in the table displacement to xh, the table displacement obtained at the time of the rg update, before it is input to a Galvano scanner servo control unit 44 for the X-axis. The Galvano scanner servo control unit 44 for the X-axis compares the reference value with the angle of rotation detected at the Galvano scanner 43 for the X-axis to determine the voltage to be applied to the Galvano scanner 43 for the X-axis. The Galvano scanner 43 for the X-axis then deflects laser pulses 46 by controlling the angle of a mirror 45 secured to the rocking shaft and irradiates the target position of the printed-circuit board 1 with the laser pulses via the condensing lens 5.

FIG. 11 only illustrates the main connecting lines between the structural elements necessary for describing the present embodiment and does not illustrate all the necessary lines between the structural elements.

Figure 12:
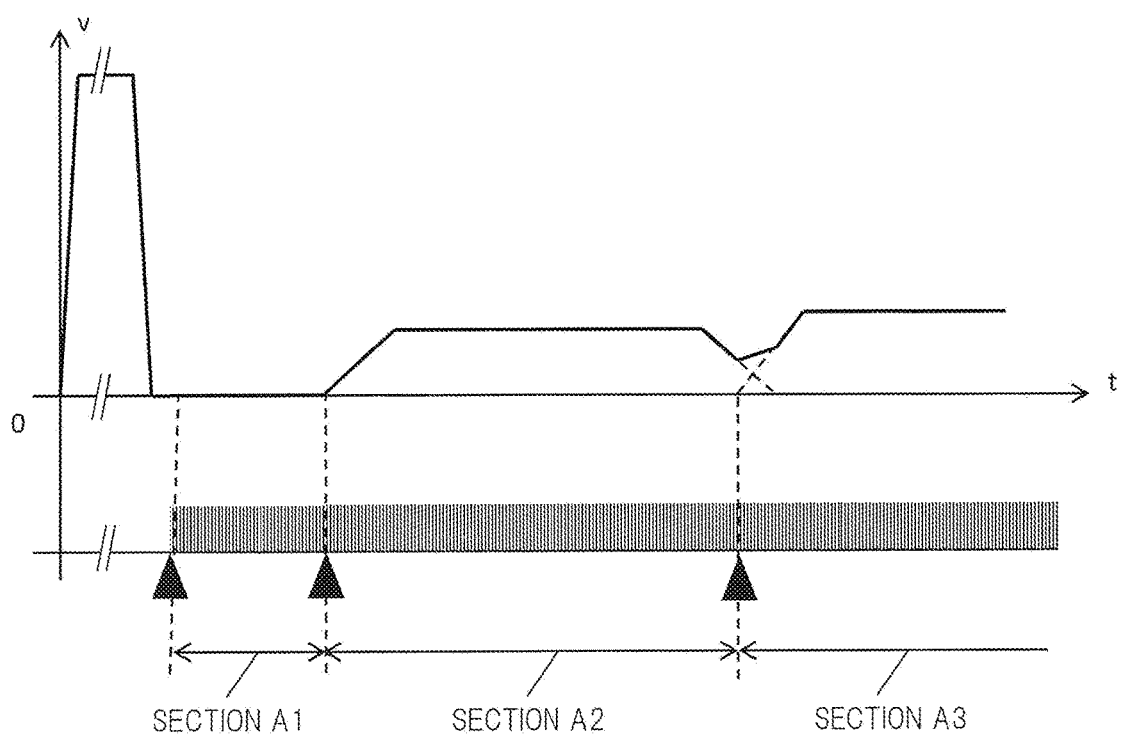
FIG. 12 is a schematic diagram illustrating the relationship between the table speed instructions and the processing for making holes by a laser scanning system in the processing example in the section series band area in FIG. 10.

FIG. 12 is a schematic diagram illustrating the relationship between the table speed instructions and the processing for making holes by the laser scanning system in the processing example in the section series band area in FIGS. 10A to 10C. The upper graph shows the waveform of the table speed instructions having a trapezoidal speed profile. The lower graph shows the laser shot sections of the laser scanning system, in which the black triangles indicate the process starting points of the sections. The hatching portions indicate the time periods for making holes by laser shots. After the table is positioned at the passing point for the first section A1, the section A1 is subjected to the stationary processing. After the processing in the section A1 is over, the table immediately starts to move along the route toward the passing point for the next section A2 having the synchronization processing attribute with moderated acceleration or reduced speed while the laser scanning system starts to perform the processing. If the processing in the section A2 is not completed by the time when the table reaches the position at a predetermined distance from the passing point for the next section A3 having the synchronization processing attribute, the table continues to move along the route toward the passing point for the section A3. When the processing in the section A2 is completed, the table is moved in accordance with the overlapped speed components of the trapezoidal speed profile for the next section A3 while processing. If the second section A2 has a small number of holes and the processing in the second section A2 is completed by the time when the table reaches the position at a predetermined distance from the passing point for the section A3, the processing halts until the table reaches the position during the time from the passing point of the section A3 to the point before the stationary distance. When the table reaches the position, the processing in the section A3 starts and the table is moved in accordance with the overlapped speed components of the trapezoidal speed profile for the section A2 and A3.

According to the first embodiment, since the stationary processing is performed in an area having a relatively low processing density, the laser scanning is finished in a short time. As the result, the table can be moved to the next section at a higher speed than in the synchronization processing, which accelerates the overall processing speed.

In addition, since the synchronization processing is performed in a section having a large number of holes, the table can be moved to the passing point for the next section while the laser scanning requiring long time is being performed. As the result, the next section is immediately subjected to the processing without the necessity for moving the table, which accelerates the overall processing speed.

Since the synchronization processing is performed in a section having a large number of holes, the synchronization moving speed cannot be extremely high. Therefore, when the synchronization processing is followed by the stationary processing, or in the opposite case, the small change in the speed of the table makes it possible to keep the accuracy of finishing.

When the table is moved between rows from the section at the end of a row to the section at the end of the same side in the next row, the table is moved with respect to the laser scanning system at the highest accelerated speed in the accelerated speeds of the table moved with respect to the laser scanning system, which shortens the time for moving the table between rows and accelerates the overall processing speed.

When there is the not-to-be-processed band areas, the table is moved from the section at the end of the previous section series band area to the section at the starting point of the next section series band area, the table is moved with respect to the laser scanning system at the highest accelerated speed which shortens the time for moving the table in the not-to-be-processed band areas and shortens the overall processing time. If the not-to-be-processed band area is too short, the table should be slowed down immediately after the acceleration. In this case, the table speed may not actually reach the targeted highest speed.

According to the above advantageous effects of the first embodiment, it is possible to obtain the combination processing that accelerates the processing speed while keeping the accuracy of finishing.

Second Embodiment

The second embodiment of the present embodiment will now be described.

Figure 13A:
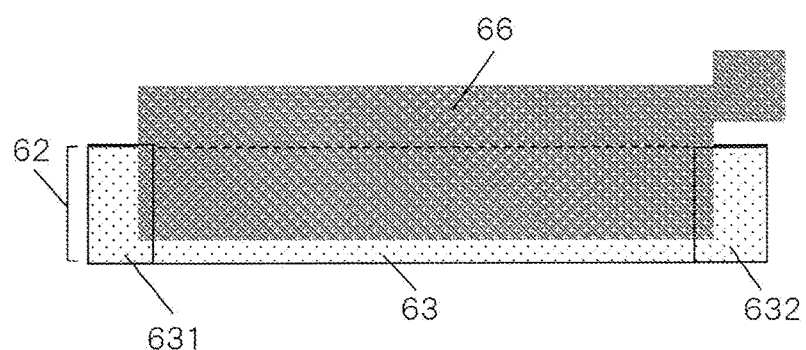
FIGS. 13A and 13B are diagrams for explaining a second embodiment of the invention.
Figure 13B:
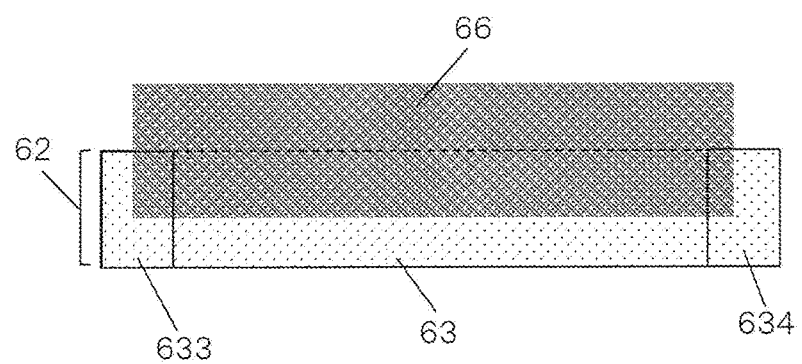

Generally, a typical printed-circuit board has a processing area 60 having a low density of holes in a circumferential area. In addition, in a not-to-be-processed band area, the density of holes often becomes lower not rapidly but gradually. When the sections with a predetermined area are sequentially determined in the processing area 60 as described above, as illustrated in FIG. 13A, the leftmost section series band area 63 in the first row at the bottom in FIGS. 5 and 6 is more likely to have a hole zone 66 with a small number of holes in the section 631 at the left end (at the starting point) near the inner circumferential area of the processing area 60 and in the section 632 at the ending point just before the next not-to-be-processed band area. As illustrated in FIG. 13B, the rightmost section series band area 63 in the first row at the bottom is more likely to have a hole zone 66 with a small number of holes in the section 633 at the left end (at the starting point) just after the previous not-to-be-processed band area and in the section 634 at the ending point near the inner circumferential area of the processing area 60.

Therefore, in the modification of the first embodiment, the sections at both ends of each row and the sections at the starting points and the ending points of the section series band areas may be given the stationary processing attributes without determining the densities of holes in these sections. This modification can be made by adding a step at which the process planning unit 21 gives the stationary processing attributes to the sections at both ends of each row and the sections at the starting points and the ending points of the section series band areas before step 111 at which the process planning unit 21 counts the number of holes in each section and gives a processing attribute to the section in the flow chart in FIG. 1, and modifying step 111 so that the process planning unit 21 gives processing attributes only to the sections with no processing attribute.

According to this second embodiment, the number of the sections given the stationary processing attributes is increased on the whole and the overall processing speed is accelerated even if some of the sections given the stationary processing attributes are more suitable for the synchronization processing.

Since the passing point for the stationary processing becomes at the middle of two sections, especially by performing the stationary processing in the sections at both ends of each row, it shortens the distance of the movement of the table by two sections in each row, which lengthens the operating life of the mechanism for relatively moving the table and saves the energy.

Accordingly, in the second embodiment, it is good enough to perform the stationary processing only in the sections at both ends of each row.

Third Embodiment

The third embodiment of the present invention will now be described.

Figure 14A:
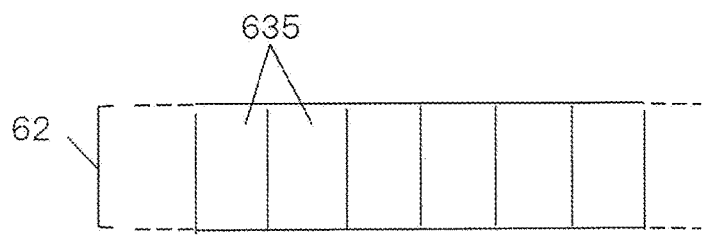
FIGS. 14A to 14C are diagrams for explaining a third embodiment of the invention.
Figure 14B:
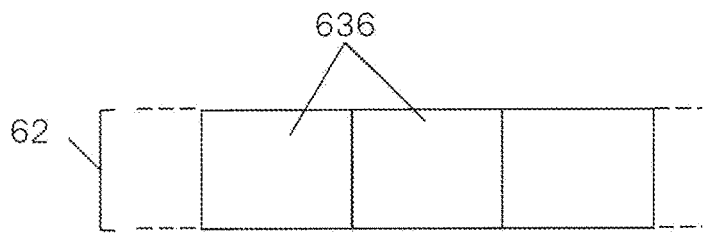

In the third embodiment, the first embodiment is modified as follows. As illustrated in FIG. 14A, in a certain row 62, if sections 635 having the stationary processing attributes are positioned in continuous series and the number of the sections 635 exceeds a predetermined number, as illustrated in FIG. 14B, a new logical section 636 having area size consisting of two continuous sections 636 (hereinafter a double section), which has area equal to the scanning area, is assigned one by one and performed processing.

This third embodiment can be embodied by adding the following steps (1) to (6) to the flow chart of FIG. 1 illustrating the operation of the process planning unit 21 of FIG. 2.

(1) After giving processing attributes at steps 111 and 112 in FIG. 1, when sections having the stationary processing attributes are positioned continuously viewed from the left end in each row, the process planning unit 21 counts the number of the sections in series.

(2) If the number counted at the above step (1) exceeds a predetermined number, the process planning unit 21 sequentially assigns new logical sections (double sections). The double section has a size consisting of two combined or connected sections and has a size equal to that of the scanning area.

(3) When sequentially assigning processing numbers to the sections, the process planning unit 21 assigns a number to a double section so that the double section will be processed seriously after the previous section (or the double section).

(4) When determining passing points, the process planning unit 21 first determines the middle point of a double section as the passing point for the double section. After that, as for the sections having the smallest number in the rows, the process planning unit 21 determines the middle point of the front side of such a section in the processing direction as the passing point for the section. As for the sections right after the sections deleted at step 106 in FIG. 1 except for the sections at the ends of the rows, the process planning unit 21 determines the middle point of the front side of such a section in the processing direction as the passing point for the section. As for the other sections, the process planning unit 21 determines the middle point of the back side of such a section in the processing direction as the passing point for the section.

(5) When assigning processing numbers for processing order to all the holes in the sections, the process planning unit 21 assigns numbers to the holes in a double section in an optimal order starting from one hole in the double section. The optimal order in this case can be realized so that the required displacement of the Galvano scanner becomes as small as possible in the double sections, between the double section and the next double section, or between the double section and the next section, for example.

(6) When calculating the X and Y components of the displacement of each hole from the passing point for the section including the hole, i.e. the required displacement of the Galvano scanner, the process planning unit 21 uses the passing point determined at the above step (4) for each hole in a double section.

Figure 14C:
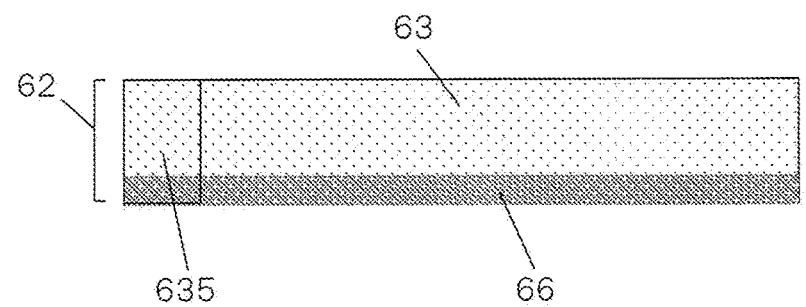

For example, in the case of the uppermost row 62 in FIG. 5, which becomes the row 62 in FIG. 14C, includes the thin hole zone 66 in the section series band area 63 like. And as shown by the representative section 635 in FIG. 14C, the sections having the stationary processing attributes continue and the number of the sections is more likely to exceed a predetermined number.

According to the third embodiment, double sections are assigned in such a row 62 to be sequentially subject to the stationary processing, which accelerates the processing speed in the row and shortens the overall processing time compared to the first embodiment.

In the third embodiment, a section having the synchronization processing attribute or a section having no hole may exist next to a section having the stationary processing attribute, so that the sections having the stationary processing attributes may exist discontinuously.

In the above embodiments, sections are sequentially assigned from one end (the left end) to the right end in the X-axis direction in all the rows so that these sections are logically arranged one by one. Alternatively, sections may sequentially be assigned from the left end in the lowermost row, and from the right end in the next row above so that the starting points for section assignment alternate between the left end and the right end in the rows, for example.

In the above embodiments, the processing direction is set in the X-axis direction and sections are assigned in this direction. Alternatively, the processing direction may be set in the Y-axis direction and rows may be assigned in this direction.

In the above embodiments, the high-speed movement instruction information is used for moving the table with respect to the laser scanning system at the highest accelerated speed in the accelerated speeds of the table moved with respect to the laser scanning system, however, this is not always the case. Alternatively, the high-speed movement instruction information may be used for moving the table at a lower accelerated speed.

In the above embodiments, the table is moved between rows and in the not-to-be-processed band areas at the highest accelerated speed in the accelerated speeds of the table. Alternatively, the table may be moved between rows and in the not-to-be-processed band areas at different accelerated speeds.

In the above embodiments, the high-speed movement instruction information is given to the sections right before the not-to-be processed band areas such as the sections at the ends of the section series band areas, and the sections at which the switch of rows is made after the processing in the sections, i.e. the sections at the ends of the rows. Alternatively, those sections may be given other information indicating the positions of the sections instead of the high-speed movement instruction information.

In the above embodiments, the size of a section is made as the size obtained bisecting the scanning area in the processing direction, i.e. the size of a section is equal to a half of the scanning area in the processing direction. Alternatively, the size of a section may be smaller than the half of the scanning area.

In the above embodiments, the descriptions of the embodiments are about the laser processing for making holes in a printed-circuit board, however, the present invention can be applied to any laser processing for processing a workpiece at several sites by laser scanning.

The present invention has been described mainly by describing the embodiments, however, the embodiments are merely examples for making the present invention clearly understood. The embodiments can be modified by replacing the structural elements of the embodiments or adding other elements to the embodiments. Accordingly, the present invention should not be limited to the embodiments.

What is claimed is:

1. A laser processing method combining synchronization processing performed by laser scanning with a laser scanning system while making the relative movement between a table for mounting a workpiece and the laser scanning system and stationary processing performed by laser scanning with the laser scanning system while halting the relative movement, comprising:
   sequentially assigning sections in a first direction parallel to or orthogonal to the direction of the relative movement in rows in a processing area of the workpiece, each of the sections having unit size smaller than a scanning area of the laser scanning system and the rows being arranged in a second direction orthogonal to the first direction; and
   setting a processing order to sequentially process the sections in the rows in the processing area from a first end to a second end of a row, and then from the second end to the first end of the next row so that the processing is performed from side to side at the rows next to each other,
   wherein the stationary processing is performed in sections having relatively low processing densities and the synchronization processing is performed in the other sections than the sections for the stationary processing.

2. The laser processing method according to claim 1, wherein the sections at both ends of each of the rows are subjected to the stationary processing.

3. The laser processing method according to claim 1, wherein the relative movement is made between rows at the highest accelerated speed in a plurality of accelerated speeds as the relative movement for processing of the processing area.

4. The laser processing method according to claim 1, wherein the section has a size bisected the size of the scanning area in the direction of the relative movement, and
   wherein the stationary processing is sequentially performed on an area having size consisting of two sections connected with each other in a row if the row includes a series of the sections for the stationary processing.

5. The laser processing method according to claim 1, wherein the relative movement is made in an area assigned no to-be-processed section in the rows at the highest accelerated speed in a plurality of accelerated speeds as the relative movement for processing of the processing area.

6. The laser processing apparatus, comprising:
a movement control unit for controlling the relative movement between a table for mounting a workpiece and a laser scanning system;
a laser scanning control unit for controlling the laser scanning in the laser scanning system;
a laser control unit for controlling the supply of laser pulses to the laser scanning system;
a process planning unit for generating a processing program to perform processing in accordance with the processing data of the workpiece before starting processing; and
a processing control unit for controlling the movement control unit, a laser scanning control unit and the laser control unit in accordance with the processing program so that synchronization processing performed by laser scanning with the laser scanning system while making the relative movement and stationary processing performed by laser scanning with the laser scanning system while halting the relative movement can be combined,
wherein sections are assigned in a first direction parallel to or orthogonal to the direction of the movement of the table in rows in a processing area of the workpiece in accordance with the processing data of the workpiece, each of the sections having unit size smaller than a scanning area of the laser scanning system and the rows being arranged in a second direction orthogonal to the first direction,
wherein a processing order is set to sequentially process the sections in the rows in the processing area from a first end to a second end of a row, and then from the second end to the first end of the next row so that the processing is performed from side to side at the rows next to each other, and
wherein the stationary processing is performed in sections having relatively low processing densities and the synchronization processing is performed in the other sections than the sections for the stationary processing.

7. The laser processing apparatus according to claim 6, wherein the sections at both ends of each of the rows are subjected to the stationary processing.

8. The laser processing apparatus according to claim 6, wherein the relative movement is made between rows at the highest accelerated speed in a plurality of accelerated speeds as the relative movement for processing of the processing area.

9. The laser processing apparatus according to claim 6, wherein the section has a size bisected the size of the scanning area in the direction of the relative movement, and
wherein the stationary processing is sequentially performed on an area having size consisting of two sections connected with each other in a row if the row includes a series of the sections for the stationary processing.

10. The laser processing apparatus according to claim 6, wherein the relative movement is made in an area assigned no to-be-processed section in the rows at the highest accelerated speed in a plurality of accelerated speeds as the relative movement for processing of the processing area.

* * * * *